Nov. 8, 1966    A. F. FREDRICKSEN    3,283,740
DISTRIBUTING APPARATUS FOR GRANULAR MATERIALS
Filed May 20, 1963    2 Sheets-Sheet 1
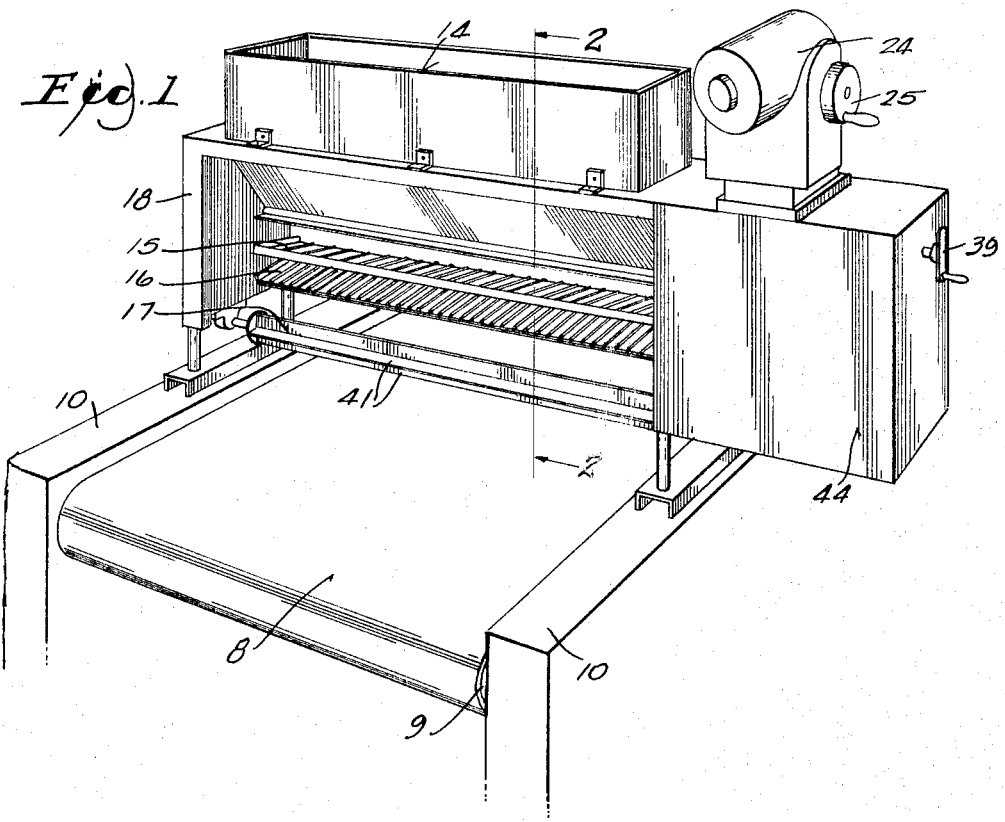
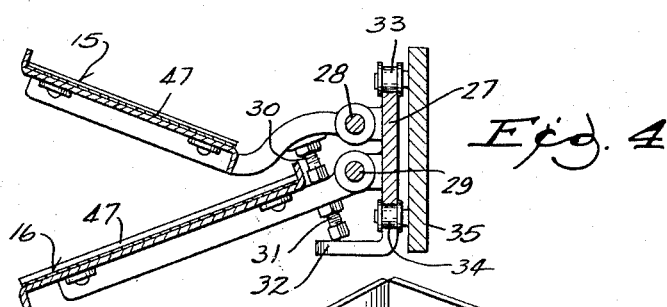
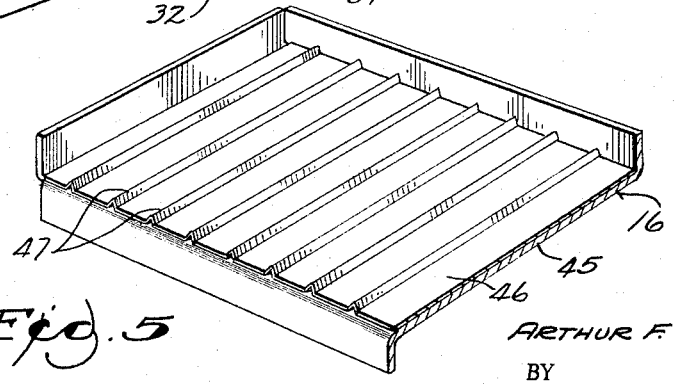
INVENTOR.
ARTHUR F. FREDRICKSEN
BY
Lieber & Nilles
ATTORNEYS Nov. 8, 1966  A. F. FREDRICKSEN  3,283,740
DISTRIBUTING APPARATUS FOR GRANULAR MATERIALS
Filed May 20, 1963  2 Sheets-Sheet 2
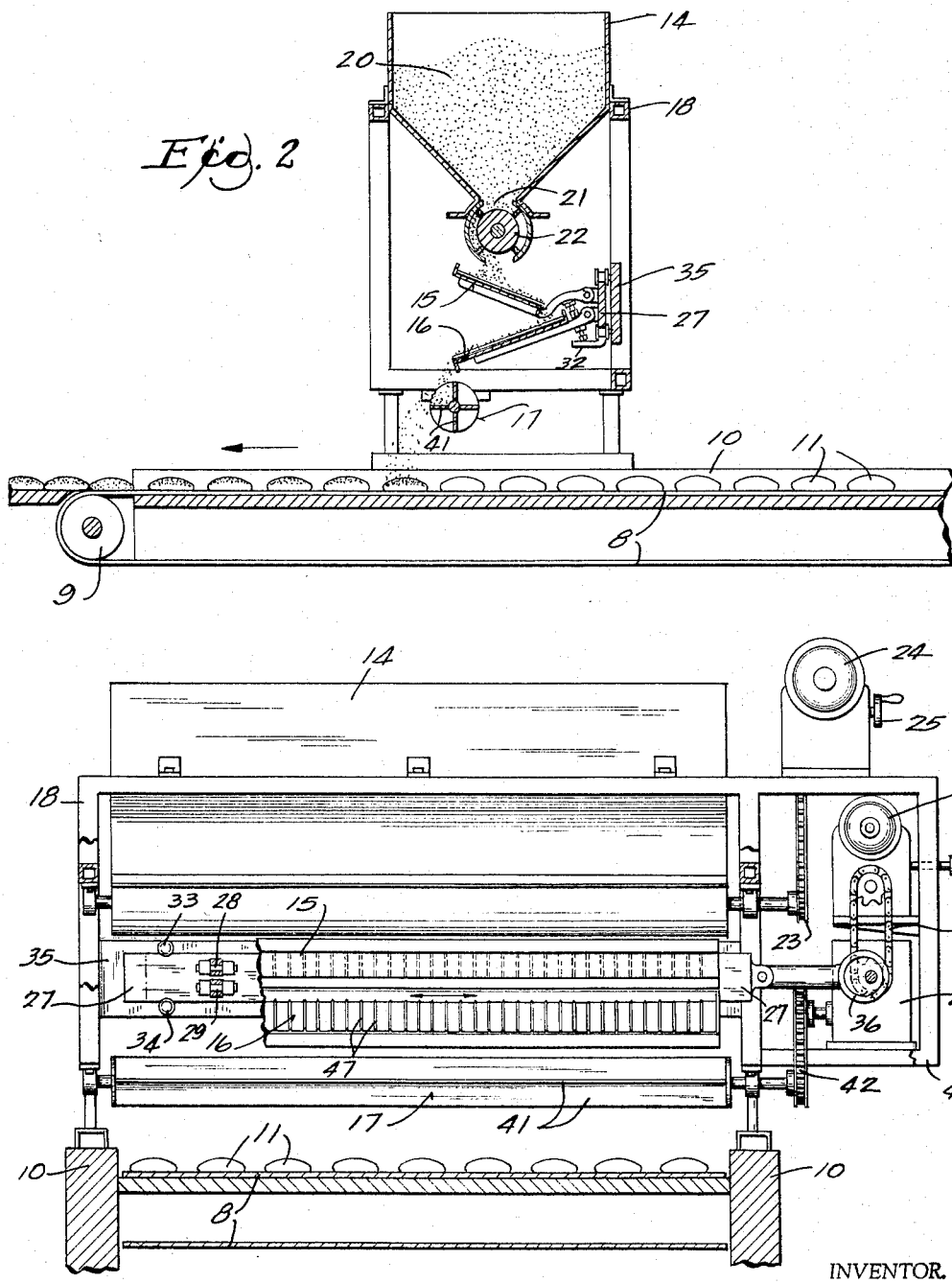
INVENTOR.
ARTHUR F. FREDRICKSEN
BY
Lieber & Nilles
ATTORNEYS

United States Patent Office 3,283,740
Patented Nov. 8, 1966

1

3,283,740
DISTRIBUTING APPARATUS FOR
GRANULAR MATERIALS
Arthur F. Fredricksen, Wauwatosa, Wis., assignor of one-half to Stuart P. Kessler, Mukwonago, Wis.
Filed May 20, 1963, Ser. No. 281,445
6 Claims. (Cl. 118—24)

The present invention relates generally to improvements in the art of distributing granular materials, and it relates more particularly to the provision of an improved machine for applying toppings or coatings to bakery products and the like.

A primary object of this invention is to provide an improved apparatus for distributing granular or comminuted materials which is extremely simple and compact in construction and highly efficient in operation while being readily adaptable for the handling of a wide variety of materials of varying sizes and weights.

In the production of confections, it is common practice to top or coat the product with dry granular or particulate materials such as, for example, sugar, spices, ground nuts, salt and other seasonings; and a number of different types of machines have heretofore been proposed for more-or-less automatically performing these topping operations.

As shown and described in U.S. Patents No. 1,801,572, dated April 21, 1931, and No. 1,966,268, some of the prior machines for applying particulate coatings to confections consisted merely in the use of a continuous conveyor for transporting the bakery products, candy or the like through a coating or topping zone wherein a shaker screen being reciprocated longitudinally of the path of travel of the products distributes the coating material, as received from a hopper, over the advancing products. The effective use of such previously proposed apparatus however is obviously limited by the mesh size of the screen, and furthermore, the distribution of the coating materials leaves much to be desired with regard to uniformity.

In other types of coating apparatus such as exemplified in U.S. Patents No. 2,347,164, dated April 18, 1944, and No. 3,045,640, dated July 24, 1962, the confection to be coated is, in effect, immersed in an abundance of the coating material as by dropping the products in succession onto a conveyor covered with coating material and advancing the same along a series of vibrating flights at varying elevations or as by actually submerging the product in the coating and advancing the same through a zone while thus submerged. With such apparatus, it is apparent that there can be no control of the quantity of coating applied to the product, and also, the use of this equipment must necessarily be limited to the less fragile confections because of the severity of the action to which the products are subjected.

Still another type of machine heretofore proposed is shown and described in U.S. Patent No. 2,666,410 wherein the confection products are conveyed in succession on a pervious or open-mesh conveyor above a revolving paddle wheel operating within a container filled with the coating material to be applied, the paddle wheel acting to throw successive batches of the coating upwardly through the openings in the conveyor and against the underside of the successive products. However, the use of such apparatus is again limited by the size of the openings in the conveyor, and there is a complete lack of uniformity of distribution.

It is therefore an important object of the present invention to provide an improved topping apparatus which obviates all of the aforementioned disadvantages and objections of prior devices intended for like purposes.

2

Another object of this invention is to provide an improved machine for distributing a wide variety of granular or particulate materials such as salt, sugar, coconut, nut pieces, seeds and the like possessing diverse characteristics in an accurately controlled and uniform manner over a continuous succession of confection products.

An additional object of the invention is to provide an improved topping and/or coating machine for confections or the like which is readily controllable as to rate of speed, density and uniformity and which is moreover extremely flexible in its adaptations both with respect to the variety of topping and/or coating materials capable of being distributed thereby as well as with respect to the diverse natures of products capable of being topped or coated effectively by the device.

Still another object of the present invention is to provide improved apparatus for distributing granular material to a succession of advancing articles which includes a supply hopper, a downwardly inclined plate disposed beneath the hopper for receiving granular material therefrom, means for reciprocating the plate transversely of its direction of inclination to cause gravitation of the granular material therefrom, and means forming a series of laterally spaced upwardly exposed dams on the plate extending transversely of the plane of reciprocation for restricting shifting movement of the granular material.

These and other objects and advantages of the invention will become apparent from the following detailed description.

A clear conception of the various features constituting a part of this invention, and of the mode of operating and of utilizing a typical topping machine embodying the improvements, may be had by referring to the accompanying drawings forming a part of this specification wherein like reference characters designate the same or similar parts in the several views.

FIG. 1 is a perspective view of a typical topping machine for confectionery products as applied to the frame of an endless conveyor;

FIG. 2 is a transverse section through the machine of FIG. 1, taken generally along the line 2—2 thereof;

FIG. 3 is a front elevation of the topping machine, parts being broken away for the sake of clarity;

FIG. 4 is a somewhat enlarged transverse section of the inclined distributing plates and the suspension means therefor; and FIG. 5 is an enlarged fragmentary perspective view of one of the inclined distributing decks embodying the invention.

While the invention has been shown and described herein as being especially advantageously embodied in a machine for applying a topping of sugar, salt or other free-flowing material to food products such as candy, cookies, crackers, potato chips or the like and with a pair of oppositely inclined distributing plates constructed in a particular manner being utilized, it is not intended to thereby unnecessarily restrict or limit the utility or the construction of the apparatus by reason of such specific illustration since other free-flowing materials can be advantageously distributed or dispersed for a variety of purposes with the device. It is also contemplated that certain specific descriptive terminology used herein shall be given the broadest possible interpretation consistent with the disclosure, and with particular reference to the use of the terms "coating" or "topping" as used herein, it is intended that they shall be interpreted to cover any instances wherein a material is dispersed to any extent on a portion or portions of an article or product.

Referring to the drawings, the improved distributing apparatus is shown therein as being applied to and utilized in conjunction with a conveyor of the type wherein an endless belt 8 is carried by spaced rollers 9 journalled for rotation on side rails 10 of a suitable supporting structure and is adapted to be driven in a customary manner to convey a succession of products 11 on its upper run along a rectilinear path. Such endless belt conveyors are, of course, of well-known construction with a detailed description being unnecessary, and other types of conveyors may obviously be utilized in lieu thereof whether they be continuous or intermittent in operation.

The distributing machine embodying the invention comprises, in general, a supply hopper 14, one or more downwardly inclined distributing decks or plates 15, 16 disposed below the hopper, and a rotatable dispersing device 17 disposed below the bottom edge of the lowermost deck 16, all carried on a suitable supporting frame 18 attachable to the side rails 10 of the conveyor.

The hopper 14, decks 15, 16 and spreader 17 are all mounted on the frame so as to extend transversely across the conveyor belt 8 which may be driven in either direction with equal effectiveness, the products 11 being shown as advancing from right to left in FIG. 2. For convenience, the hopper 14 may be loaded from the top with an abundant supply of the granular material 20, and is provided with a lower elongated discharge opening or orifice 21 from which the material 20 is fed under the control of a rotatable metering valve 22 to the upper inclined plate 15, the valve 22 being rotated in a suitable manner at a selected speed as by a chain and sprocket connection 23 with a motor 24 provided with a variable speed reducer 25.

The uppermost plate 15 is disposed directly under the discharge orifice 21 and metering valve 22 of the hopper 14 so as to receive all of the granular material fed therefrom, the plates 15, 16 being oppositely inclined downwardly toward the conveyor belt 8 with the upper portion of the lower plate 16 being disposed below the lowermost edge of the upper plate 15 to thereby receive all of the granular material gravitating from the upper plate. These plates 15, 16 may both be mounted on a common carrier member 27 as by means of separate pivot shafts 28, 29 respectively to thereby permit independent adjustments in the angularity of the plates 15, 16 as by means of set screws or threaded adjustment pins 30, 31 respectively interposed between the frames for the plates 15, 16 as by means of set screws or threaded adjustment pins 30, 31 respectively interposed between the frames for the plates 15, 16 and the frame for the plate 16 and laterally projecting lugs 32 on the common carrier bar 35.

The inclined distributing plates 15, 16 are reciprocated in planes transverse to their direction of inclination and transversely of the path of advancement of the belt 8 and products 11 carried thereby, and to permit reciprocation of the plates, the common carrier member 27 may be mounted between upper and lower roller bearings 33, 34 carried on and projecting laterally from a fixed crosspiece 35 of the frame 18. An end of the common carrier bar 27, is, in turn, pivotally connected to the shaft of an eccentric 36 which is carried on a shaft rotatable through a chain and sprocket connection 37 by a motor 38 also provided with a variable speed reducer 39. Thus the upper and lower plates 15, 16 are caused to simultaneously reciprocate by means of the eccentric 36 operably connected to the common carrier bar 27 which is supported by the bearings 33, 34.

The rotatable spreader 17 is located directly beneath the lower edge of the plate 16 and is provided with an annular series of spaced vanes 41 for contacting the gravitating granular material and dispersing it in a fine uniform spray over the products 11, the spreader 17 being journalled at its ends in the frame 18 and being driven through a chain and sprocket drive connection 42 and speed reducer 43 from the motor 38. As shown in the drawings, the motor 38, speed reducer 43 and the drive connections 36, 37 and 42 may all be protectively housed in a casing 44 secured to the frame 18, and the motor 24 may be mounted on the casing 44 to provide a compact and unitary machine.

In accordance with this invention, means are provided on the inclined shaker plates to prevent or resist the tendency of the granular materials to migrate and pile up at the ends of the plates 15, 16 during reciprocation thereof, and for such purpose, the plates 15, 16 are each formed with a series of laterally spaced upwardly exposed dams 47. These dams extend in the direction of inclination of the shaker plates 15, 16 and transversely of the plane of reciprocation thereof, and they therefore function to restrict shifting movement of the granular material along the plates in the direction of reciprocation thereof while not in any way restricting gravitation of the material therealong. While the plates 15, 16 may each be formed of a single piece of sheet metal or the like stamped to provide the upwardly directed ribs, it is preferred to form the same of two pieces as shown in FIG. 5 wherein only one of the shakers 16 has been shown by way of illustration since plate 15 may be formed identical thereto. In this illustration, a sturdy frame 45 is provided which is formed with a flange projecting upwardly from its upper edge and with a depending flange along its lower edge, and a thin sheet metal sheet 46 having spaced ribs or corrugations 47 and upwardly extending end flanges is secured to the frame 45 in a suitable manner. This forms an extremely sturdy assembly which is capable of being fabricated quickly and at low cost, but the provision of the dams 47 for restricting shifting movement of the granular material along the plates 15, 16 without interfering with the gravitation thereof is the important feature without regard to the specific construction.

In operation, the speeds of the motors 24 and 38 and the angles of inclination of the plates 15, 16 are adjusted according to the nature of the granular materials to be distributed and the rate of speed of distribution and advancement of the products 11 to be topped considered together with the amount of topping to be applied thereto. After the proper adjustments have been effected, the endless conveyor and the topping machine are simultaneously placed into operation with a supply of granular material having first been introduced into the hopper 14. The metering valve 22 thereupon continuously discharges granular material at a selected rate of speed from the hopper 14 to the upper inclined shaker plate 15 along which the material gravitates to the lower plate 16 by reason of the reciprocating action imparted thereto by the eccentric 36. The material continues its gravitation downwardly over the inclined plate 16 and is fed at the lower end thereof to the rotating spinner or spreader 17, the vanes of which impact against the granular material to disperse and throw the same over and against the surfaces of the products 11 being conveyed through the distributing zone by the conveying belt 8. During gravitation of the granular material downwardly along the inclined plates 15, 16, the shifting of the material in the direction of reciprocation of the plates is effectively resisted by the upwardly exposed ribs or dams 47, and the granular material is accordingly distributed with utmost uniformity transversely across the entire area of the rectilinear path in which the products 11 are being conveyed. The improved apparatus embodying the present invention have been placed in actual commercial use and have met with considerable commercial success, and it is noteworthy that adjustments may be made in the machine while in operation in order to compensate for particle size, pattern desired, rate of feed of the articles to which the freeflowing material is being applied and any other variables.

Various modes of carrying out the invention are contemplated as being within the scope of the following claims particularly pointing out and distinctly claiming the subect matter which is regarded as the invention.

I claim:

1. Apparatus for distributing granular material to a succession of articles, comprising, a conveyor for advancing the articles in succession along a rectilinear path, a granular material supply hopper located above said conveyor, means for feeding granular material from said hopper, at least one downwardly inclined distributing deck interposed between said hopper and said conveyor for receiving granular material from said hopper and distributing the same to articles advancing along said conveyor, means pivotally supporting said deck adjacent one edge thereof, means for adjusting the position of said deck about its pivotal support to vary the angle of inclination thereof, means operable through said pivotal supporting means for reciprocating said deck in a plane transverse to its direction of inclination to agitate and cause the granular material to gravitate from the lower edge of said deck, and means forming a series of laterally spaced upwardly exposed dams on said deck extending transversely of the plane of reciprocation thereof for restricting shifting movement of the granular material along said deck.

2. Apparatus according to claim 1, wherein a rotatable member having radiating vanes is provided beneath the lower edge of the inclined deck and above the conveyor for contacting and spreading the granular material as it gravitates from said deck.

3. Apparatus according to claim 1, wherein the deck transversely spans the conveyor and the rectilinear path of advancement of the articles and is inclined with respect to the plane along which the articles are advanced by the conveyor.

4. Apparatus according to claim 1, wherein a pair of oppositely inclined decks are provided, the decks being positioned one above the other with the upper portion of the lower deck immediately below the lower edge of the upper deck and both decks being pivotally supported on a common carrier member through which the means for reciprocating the decks is operable.

5. Apparatus according to claim 4, wherein means is provided for effecting independent adjustments in the angle of inclination of each of the decks about its respective pivotal support.

6. Apparatus according to claim 4, wherein the decks are pivotally supported on a common carrier member with the pivotal support for the upper deck being adjacent to the lower edge thereof and the pivotal support for the lower deck being located adjacent to the upper edge thereof with both decks being simultaneously reciprocated by said common carrier member.

References Cited by the Examiner
UNITED STATES PATENTS

| | | | |
|---|---|---|---|
| 1,466,821 | 9/1923 | Eckert | 118—57 |
| 1,904,591 | 4/1933 | Wilson | 118—57 |
| 2,551,849 | 5/1951 | Petrilli | 198—220 |
| 2,962,381 | 11/1960 | Dobry et al. | 118—308 X |
| 3,168,412 | 2/1965 | Wald et al. | 118—308 X |

CHARLES A. WILLMUTH, *Primary Examiner.*

J. P. McINTOSH, *Assistant Examiner.*